United States Patent
Liu

(10) Patent No.: US 10,803,712 B2
(45) Date of Patent: Oct. 13, 2020

(54) INTELLIGENT ADVERTISEMENT SYSTEM AND METHOD BASED ON DUPLEX PRINTER

(71) Applicant: Guangzhou Zonerich Business Machine Co. Ltd., Guangzhou (CN)

(72) Inventor: Liqiang Liu, Guangzhou (CN)

(73) Assignee: Guangzhou Zonerich Business Machine Co., Ltd., Guangzhou (CN)

( * ) Notice: Subject to any disclaimer, the term of this patent is extended or adjusted under 35 U.S.C. 154(b) by 0 days.

(21) Appl. No.: 16/749,087

(22) Filed: Jan. 22, 2020

(65) Prior Publication Data

US 2020/0160671 A1 May 21, 2020

Related U.S. Application Data

(63) Continuation of application No. PCT/CN2017/095976, filed on Aug. 4, 2017.

(30) Foreign Application Priority Data

Jul. 28, 2017 (CN) .......................... 2017 1 0627228

(51) Int. Cl.
*G06Q 20/00* (2012.01)
*G07G 1/14* (2006.01)
(Continued)

(52) U.S. Cl.
CPC ........... *G07G 1/14* (2013.01); *G06Q 30/0268* (2013.01); *G06Q 30/0276* (2013.01); *G07G 5/00* (2013.01)

(58) Field of Classification Search
CPC ...................... G06Q 30/0268; G06Q 30/0276
(Continued)

(56) References Cited

U.S. PATENT DOCUMENTS

2007/0134039 A1* 6/2007 Van Demark ............. B41J 2/32
400/61

FOREIGN PATENT DOCUMENTS

CN 1365477 A * 8/2002
CN 1365477 A 8/2002
(Continued)

OTHER PUBLICATIONS

International Search Report issued by the International Searching Authority for corresponding International Patent Application No. PCT/CN2017/095976, dated Apr. 20, 2018, with full English translation.

(Continued)

*Primary Examiner* — Rokib Masud
(74) *Attorney, Agent, or Firm* — Myers Wolin, LLC

(57) ABSTRACT

Provided are an intelligent advertisement system and method based on a duplex printer, the method including steps of: receiving, through an advertisement releasing terminal, advertisement content input by a user, generating advertisement information and then sending the advertisement information to a cloud advertisement server; receiving, through the cloud advertisement server, the advertisement information sent by the advertisement releasing terminal, and then pushing the advertisement information to each duplex printer; receiving, through each duplex printer, the advertisement information and printing the advertisement information on a back of cash register paper while printing cash register information; and playing, through each printer control terminal, a corresponding advertisement prompt message based on the advertisement information printed by the duplex printer.

8 Claims, 2 Drawing Sheets

(51) Int. Cl.
*G06Q 30/02* (2012.01)
*G07G 5/00* (2006.01)

(58) Field of Classification Search
USPC ..................................................... 705/16, 21
See application file for complete search history.

(56) References Cited

FOREIGN PATENT DOCUMENTS

| CN | 1881882 A | | 12/2006 |
|---|---|---|---|
| CN | 101261716 A | | 9/2008 |
| CN | 101540131 | * | 9/2009 |
| CN | 101540131 A | | 9/2009 |
| CN | 101540131 | * | 12/2012 |
| CN | 102825925 A | | 12/2012 |
| CN | 203465793 U | | 3/2014 |
| CN | 105512917 A | | 4/2016 |
| EP | 0887743 A1 | | 12/1998 |
| WO | 2012116620 A1 | | 9/2012 |

OTHER PUBLICATIONS

First Office Action issued by the State Intellectual Property Office of People's Republic of China for corresponding Chinese Patent Application No. 201710627228.7, dated Mar. 14, 2019, with full, machine-generated English translation attached.
Second Office Action issued by the State Intellectual Property Office of People's Republic of China for corresponding Chinese Patent Application No. 201710627228.7, dated Jul. 12, 2019, with full, machine-generated English translation attached.
Written Opinion issued by the International Searching Authority for corresponding International Patent Application No. PCT/CN2017/095976, dated Apr. 20, 2018, with machine-generated English translation attached.

* cited by examiner

INTELLIGENT ADVERTISEMENT SYSTEM AND METHOD BASED ON DUPLEX PRINTER

CROSS REFERENCE TO RELATED APPLICATIONS

This application is a continuation of International Application No. PCT/CN2017/095976, filed on Aug. 4, 2017, which takes priority from Chinese Patent Application No. 201710627228.7, filed on Jul. 28, 2017, the contents of each of which are incorporated by reference herein.

TECHNICAL FIELD

The present disclosure relates to the field of advertisement information releasing, and in particular, to an intelligent advertisement system and method based on a duplex printer.

BACKGROUND

At present, the back of cash register paper is generally blank. If advertisements need to be printed on the back of the cash register paper, according to the existing technology, the advertisements are printed on the back of the cash register paper in advance after advertisement content is customized by advertisers, and then the cash register paper is put into use at a checkout counter. This method needs to collect the advertisement content in advance, and also needs to carry out a plurality of steps such as transportation, printing, and cash register paper distribution, which consume many manpower and material resources and need a relatively long time period. In addition, the advertisement content printed in this method is fixed and cannot be changed after being printed on the back of the cash register paper. This easily causes invalid advertisements, junk advertisements, and the like. The timeliness of the advertisement information is poor, and the advertisement information cannot be updated in time or released as soon as possible. Moreover, in this advertising method, the advertisements are only printed on the back of the cash register paper without corresponding advertisement reminders. Many consumers actually do not go over the cash register paper after receiving it, and a real objective of advertisement data releasing cannot be achieved.

SUMMARY

To resolve the foregoing technical problems, the present disclosure provides an intelligent advertisement system based on a duplex printer; and further provides an intelligent advertisement method based on a duplex printer.

To resolve the technical problems, the present disclosure adopts the following technical solution:

an intelligent advertisement system based on a duplex printer, including a cloud advertisement server, at least one advertisement releasing terminal, and a plurality of duplex printers, the cloud advertisement server is wirelessly connected to the advertisement releasing terminal and each duplex printer respectively, and each duplex printer is connected to a printer control terminal;

the advertisement releasing terminal is configured to receive advertisement content input by a user, generate advertisement information, and then send the advertisement information to the cloud advertisement server;

the cloud advertisement server is configured to receive the advertisement information sent by the advertisement releasing terminal, and then push the advertisement information to each duplex printer;

each duplex printer is configured to receive the advertisement information and print the advertisement information on a back of cash register paper while printing cash register information; and each printer control terminal is configured to play a corresponding advertisement prompt message based on the advertisement information printed by the duplex printer.

Further, the printer control terminal is provided with an advertisement display screen, a voice playing module, and/or a short message sending module, and the advertisement prompt message includes an advertisement prompt image or video to be played through the advertisement display screen, an advertisement prompt audio to be played through the voice playing module, and/or short message notification information to be sent through the short message sending module.

Further, the plurality of duplex printers are divided into a plurality of specified categories in advance, and the advertisement prompt message is obtained and stored in the printer control terminal by:

obtaining, by the cloud advertisement server, through matching based on a specified category of each duplex printer, first N pieces of advertisement information with the highest printing frequency corresponding to the specified category, further obtaining advertisement prompt messages corresponding to the N pieces of advertisement information, and then sending the advertisement prompt messages to a printer control terminal corresponding to the duplex printer for storage; where N is a preset positive integer.

Further, near a cash register paper printing outlet, the duplex printer is provided with a photoelectric sensor configured to detect cash register paper status information, and each printer control terminal is specifically configured to:

obtain the cash register paper status information detected by the photoelectric sensor, and further locally obtain and play the corresponding advertisement prompt message based on the advertisement information printed by the duplex printer when it is determined that the cash register paper is removed.

To resolve the technical problems, the present disclosure adopts another technical solution:

an intelligent advertisement method based on a duplex printer, including steps of:

receiving, through an advertisement releasing terminal, advertisement content input by a user, generating advertisement information, and then sending the advertisement information to a cloud advertisement server;

receiving, through the cloud advertisement server, the advertisement information sent by the advertisement releasing terminal, and then pushing the advertisement information to each duplex printer;

receiving, through each duplex printer, the advertisement information and printing the advertisement information on a back of cash register paper while printing cash register information; and playing, through each printer control terminal, a corresponding advertisement prompt message based on the advertisement information printed by the duplex printer.

Further, the plurality of duplex printers are divided into a plurality of specified categories in advance, and the intelligent advertisement method further includes the following steps of:

obtaining, by the cloud advertisement server through matching based on a specified category of each duplex printer, first N pieces of advertisement information with the highest printing frequency corresponding to the specified category, further obtaining advertisement prompt messages corresponding to the N pieces of advertisement information, and then sending the advertisement prompt messages to a printer control terminal corresponding to the duplex printer for storage; where N is a preset positive integer.

Further, the step of playing, through each printer control terminal, a corresponding advertisement prompt message based on the advertisement information printed by the duplex printer is specifically:

obtaining, through each printer control terminal, cash register paper status information detected by a photoelectric sensor, and further locally obtaining and playing the corresponding advertisement prompt message based on the advertisement information printed by the duplex printer when it is determined that the cash register paper is removed.

Further, the method includes the following steps of:

when each printer control terminal does not locally obtain the advertisement prompt message corresponding to the advertisement information, counting the advertisement information, and sending an advertisement prompt message request to the cloud advertisement server after a count value reaches a preset threshold.

Further, the first N pieces of advertisement information with the highest printing frequency corresponding to the specified category are obtained through the following steps of:

sending, through each duplex printer, real-time printed data in a period of time to the cloud advertisement server; and collecting, through the cloud advertisement server, cloud statistics on the real-time printed data of the duplex printer of each specified category, and extracting and obtaining first N pieces of advertisement information with the highest printing frequency corresponding to the specified category.

Further, the method includes the following steps of:

receiving, through the advertisement releasing terminal, advertisement prompt messages associated with different advertisement information input by a user, sending the advertisement prompt messages to the cloud advertisement server; and establishing, through the cloud advertisement server, an advertisement prompt message database and a corresponding mapping relationship database based on the received advertisement prompt messages and association relationships thereof; where the mapping relationship database is used for reflecting mapping relationships between different advertisement messages and corresponding advertisement prompt messages.

The cloud advertisement server matches the N pieces of advertisement information with the mapping relationship database, and then extracts corresponding advertisement prompt messages from the advertisement prompt message database based on obtained mapping relationships, so as to obtain the advertisement prompt messages corresponding to the N pieces of advertisement information.

The system and method of the present disclosure have the following beneficial effect: In the present disclosure, a cloud advertisement server, an advertisement releasing terminal, a plurality of duplex printers, and a plurality of printer control terminals are adopted, so that to-be-sent advertisement information can be sent in time over a communication network to the duplex printers for targeted printing. As such, various types of advertisement information can be printed with no need to consume a large quantity of manpower and material resources in advance for printing, and the advertisement information can be updated or released at any time. Moreover, timely advertisement reminding can be implemented when the advertisement information is printed, and corresponding images/videos/audios can be played based on the printed advertisement content. In this way, attention of consumers can be called to the advertisement information, thereby achieving better advertisement effects. The present disclosure is high in timeliness and has a good data pushing effect, and can meet requirements for advertisement information pushing.

DETAILED DESCRIPTION OF THE PREFERRED EMBODIMENTS

Figure 1:
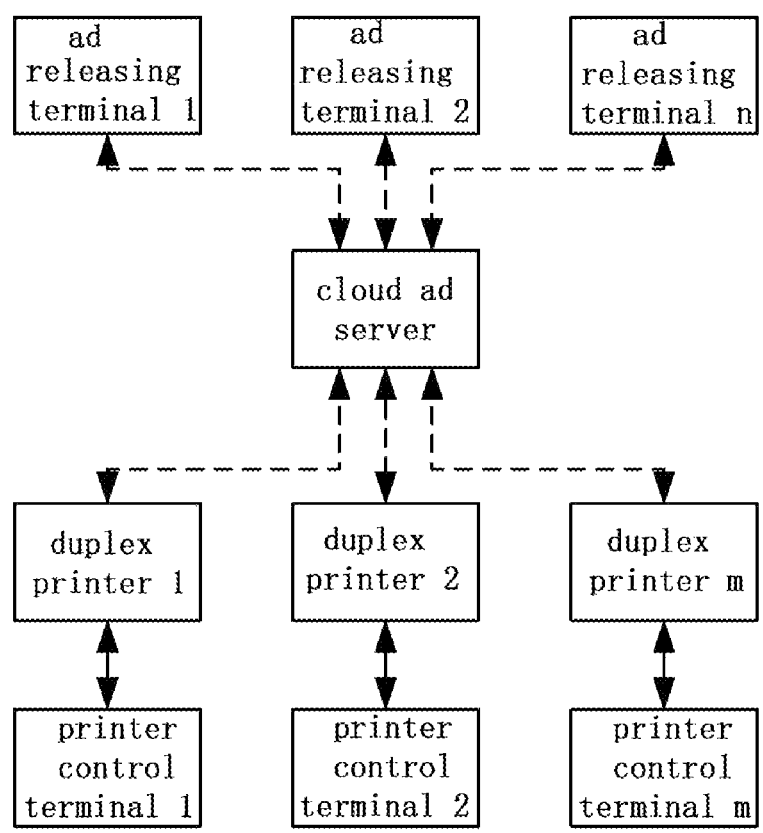
FIG. 1 is a structural block diagram of an intelligent advertisement system based on a duplex printer according to the present disclosure.

Referring to FIG. 1, the present disclosure provides an intelligent advertisement system based on a duplex printer, including a cloud advertisement server, at least one advertisement releasing terminal, and a plurality of duplex printers, the cloud advertisement server is wirelessly connected to the advertisement releasing terminal and each duplex printer respectively, and each duplex printer is connected to a printer control terminal; the advertisement releasing terminal is configured to receive advertisement content input by a user, generate advertisement information, and then send the advertisement information to the cloud advertisement server; the cloud advertisement server is configured to receive the advertisement information sent by the advertisement releasing terminal, and then push the advertisement information to each duplex printer; each duplex printer is configured to receive the advertisement information and print the advertisement information on the back of cash register paper while printing cash register information; and each printer control terminal is configured to play a corresponding advertisement prompt message based on the advertisement information printed by the duplex printer.

As a further preferred embodiment, the printer control terminal is provided with an advertisement display screen, a voice playing module, and/or a short message sending module, and the advertisement prompt message includes an advertisement prompt image or video to be played through the advertisement display screen, an advertisement prompt audio to be played through the voice playing module, and/or short message notification information to be sent through the short message sending module.

As a further preferred embodiment, the plurality of duplex printers are divided into a plurality of specified categories in advance, and the advertisement prompt message is obtained and stored in the printer control terminal in a manner as follows.

The cloud advertisement server obtains, through matching based on a specified category of each duplex printer, first N pieces of advertisement information with the highest printing frequency corresponding to the specified category, further obtains advertisement prompt messages corresponding to the N pieces of advertisement information, and then sends the advertisement prompt messages to a printer control terminal corresponding to the duplex printer for storage; where N is a preset positive integer.

As a further preferred embodiment, near a cash register paper printing outlet, the duplex printer is provided with a photoelectric sensor configured to detect cash register paper status information, and each printer control terminal is specifically configured to:

obtain the cash register paper status information detected by the photoelectric sensor, and further locally obtain and play the corresponding advertisement prompt message based on the advertisement information printed by the duplex printer when it is determined that the cash register paper is removed.

The cash register paper status information is status information that is obtained by performing an analysis based on a photoelectric signal detected by the photoelectric sensor and is used to determine whether the cash register paper is removed. The photoelectric sensor may be a reflective photoelectric sensor and is disposed in an area covered by printed cash register paper at the cash register paper printing outlet. Whether cash register paper covers the photoelectric sensor can be analyzed based on a detected reflected signal, so as to determine and obtain the status information about whether the cash register paper is removed.

The specified categories refer to a plurality of categories obtained through division based on distribution areas, industry information, or printed commodity information of the duplex printers, or a plurality of categories obtained by obtaining historical printed data of a plurality of duplex printers within a period of time, performing data cleansing, and further performing clustering and grouping based on commodity information in the historical printed data.

Figure 2:
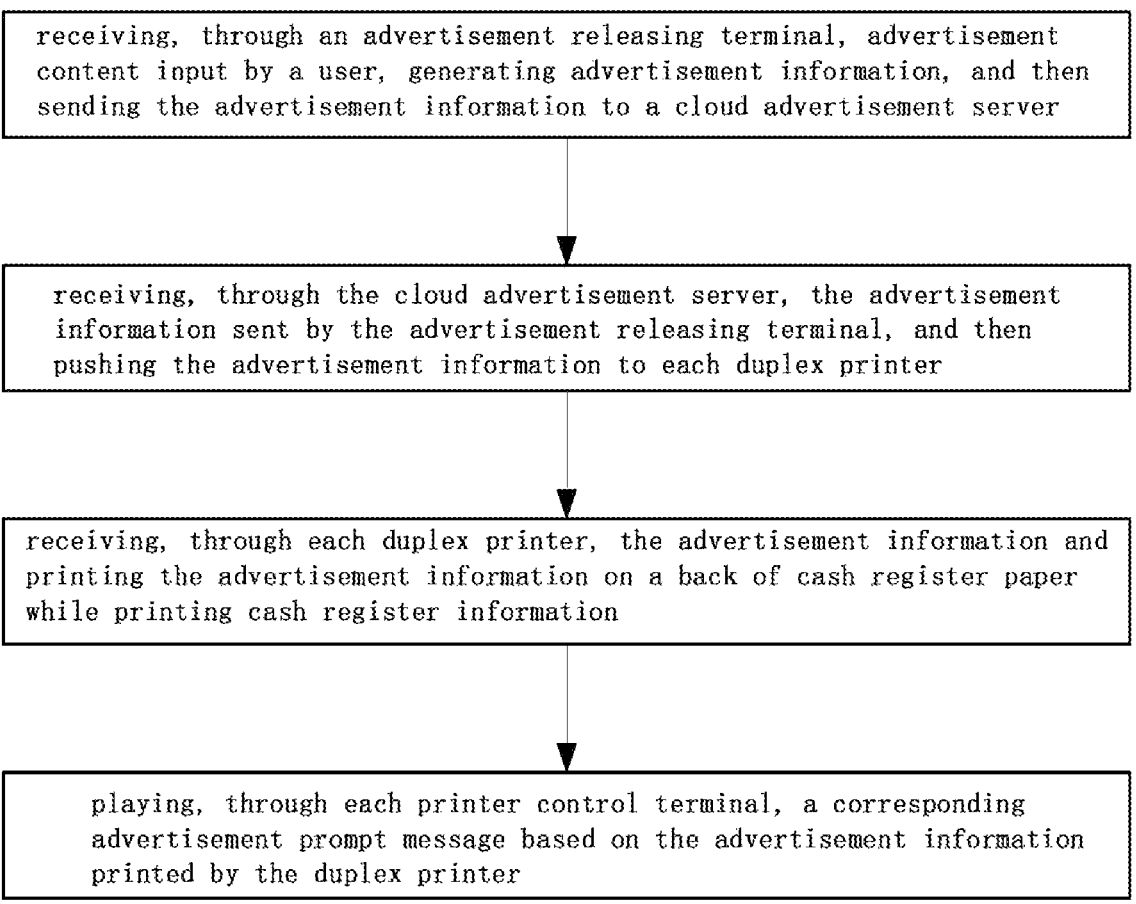
FIG. 2 is a flowchart of an intelligent advertisement method based on a duplex printer according to the present disclosure.

Referring to FIG. 2, the present disclosure further provides an intelligent advertisement method based on a duplex printer, including steps of:

receiving, through an advertisement releasing terminal, advertisement content input by a user, generating advertisement information, and then sending the advertisement information to a cloud advertisement server;

receiving, through the cloud advertisement server, the advertisement information sent by the advertisement releasing terminal, and then pushing the advertisement information to each duplex printer;

receiving, through each duplex printer, the advertisement information and printing the advertisement information on the back of cash register paper while printing cash register information; and playing, through each printer control terminal, a corresponding advertisement prompt message based on the advertisement information printed by the duplex printer.

As a further preferred embodiment, the plurality of duplex printers are divided into a plurality of specified categories in advance, and the intelligent advertisement method further includes the following steps of:

obtaining, by the cloud advertisement server, through matching based on a specified category of each duplex printer, first N pieces of advertisement information with the highest printing frequency corresponding to the specified category, further obtaining advertisement prompt messages corresponding to the N pieces of advertisement information, and then sending the advertisement prompt messages to a printer control terminal corresponding to the duplex printer for storage; where N is a preset positive integer.

As a further preferred embodiment, the step of playing, through each printer control terminal, a corresponding advertisement prompt message based on the advertisement information printed by the duplex printer is specifically:

obtaining, through each printer control terminal, cash register paper status information detected by a photoelectric sensor, and further locally obtaining and playing the corresponding advertisement prompt message based on the advertisement information printed by the duplex printer when it is determined that the cash register paper is removed.

As a further preferred embodiment, the method includes the following steps of:

when each printer control terminal does not locally obtain the advertisement prompt message corresponding to the advertisement information, counting the advertisement information, and sending an advertisement prompt message request to the cloud advertisement server after a count value reaches a preset threshold.

As a further preferred embodiment, the first N pieces of advertisement information with the highest printing frequency corresponding to the specified category are obtained through the following steps of:

sending, through each duplex printer, real-time printed data in a period of time to the cloud advertisement server; and collecting, through the cloud advertisement server, cloud statistics on the real-time printed data of the duplex printer of each specified category, and extracting and obtaining first N pieces of advertisement information with the highest printing frequency corresponding to the specified category.

As a further preferred embodiment, the method includes the following steps of:

receiving, through the advertisement releasing terminal, advertisement prompt messages associated with different advertisement information input by a user, sending the advertisement prompt messages to the cloud advertisement server; and establishing, through the cloud advertisement server, an advertisement prompt message database and a corresponding mapping relationship database based on the received advertisement prompt messages and association relationships thereof;

the mapping relationship database is used for reflecting mapping relationships between different advertisement messages and corresponding advertisement prompt messages.

The cloud advertisement server matches the N pieces of advertisement information with the mapping relationship database, and then extracts corresponding advertisement prompt messages from the advertisement prompt message database based on obtained mapping relationships, so as to obtain the advertisement prompt messages corresponding to the N pieces of advertisement information.

As a further preferred embodiment, the step of receiving, through each duplex printer, the advertisement information and printing the advertisement information on the back of cash register paper while printing cash register information includes:

receiving and parsing, through each duplex printer, the advertisement information, and generating a corresponding printing format based on dimensions of the cash register paper; and printing the advertisement information in the corresponding printing format on the back of the cash register paper in real time while printing the cash register information.

As a further preferred embodiment, the method includes the following steps of:

obtaining historical printed data of a plurality of duplex printers within a period of time, performing data cleansing, and further performing clustering and grouping based on commodity information in the historical printed data to classify the plurality of duplex printers into a plurality of specified categories.

As a further preferred embodiment, the method includes the following two steps of:

sending, through each duplex printer, printed commodity information to the cloud advertisement server in real time; and performing, through the cloud advertisement server, data cleansing periodically based on historical printed data of each duplex printer, further performing clustering and grouping based on commodity information in the historical printed data, and then updating the specified categories of the plurality of duplex printers.

The present disclosure is described in detail with reference to more specific embodiments below.

Referring to FIG. 1, an intelligent advertisement system based on a duplex printer includes a cloud advertisement server, at least one advertisement releasing terminal, and a plurality of duplex printers, the cloud advertisement server is wirelessly connected to the advertisement releasing terminal and each duplex printer respectively, and each duplex printer is connected to a printer control terminal; the advertisement releasing terminal is configured to receive advertisement content input by a user, generate advertisement information, and then send the advertisement information to the cloud advertisement server; the cloud advertisement server is configured to receive the advertisement information sent by the advertisement releasing terminal, and then push the advertisement information to each duplex printer; each duplex printer is configured to receive the advertisement information and print the advertisement information on the back of cash register paper while printing cash register information; and each printer control terminal is configured to play a corresponding advertisement prompt message based on the advertisement information printed by the duplex printer. As shown in FIG. 1, advertisement releasing terminals 1 to n, duplex printers 1 to m, and printer control terminals 1 to m are included, where n is a positive integer greater than or equal to 1, and m is a positive integer greater than or equal to 2.

In this embodiment, in addition to a normal display module and input module, the printer control terminal is further provided with an advertisement display screen, a voice playing module, and/or a short message sending module, the advertisement prompt message includes an advertisement prompt image or video to be played through the advertisement display screen, an advertisement prompt audio to be played through the voice playing module, and/or short message notification information to be sent through the short message sending module. More specifically, the advertisement prompt message may be an image or video that corresponds to the advertisement information and is to be played through the advertisement display screen. For example, when catering advertisement information is printed, a corresponding food image or food video can be played through the advertisement display screen. The advertisement prompt message may alternatively be a voice prompt message to be played through the voice playing module. For example, when a piece of advertisement information is limited-time offer information, a voice prompt message of "enjoying the offer before a certain day of a certain month" is played. In addition, corresponding short message notification information may alternatively be sent to consumers at the same time through the short message sending module. At least one of the three types of prompt messages, namely, the image/video, the advertisement prompt audio, and the short message notification information, can be played at a time.

In this embodiment, the plurality of duplex printers are divided into a plurality of specified categories in advance, and the advertisement prompt message is obtained and stored in the printer control terminal in a manner as follows.

The cloud advertisement server obtains, through matching based on a specified category of each duplex printer, first N pieces of advertisement information with the highest printing frequency corresponding to the specified category, further obtains advertisement prompt messages corresponding to the N pieces of advertisement information, and then sends the advertisement prompt messages to a printer control terminal corresponding to the duplex printer for storage; where N is a preset positive integer.

The specified categories refer to a plurality of categories obtained through division based on distribution areas, industry information, or printed commodity information of the duplex printers. Preferably, in this embodiment, the specified categories refer to a plurality of categories obtained by obtaining historical printed data of a plurality of duplex printers within a period of time, performing data cleansing, and further performing clustering and grouping based on commodity information in the historical printed data.

The step of performing data cleansing includes abnormal data processing, and deletion processing of small-probability data. The abnormal data processing refers to removal of data that apparently do not belong to commodity information. The deletion processing of small-probability data refers to deletion of commodity data with an occurrence quantity less than a preset proportion threshold in historical printed data, so that commodities that rarely appear can be removed during categorization performed based on the commodity information, thereby reducing generation of invalid categories.

In this embodiment, near a cash register paper printing outlet, the duplex printer is provided with a photoelectric sensor configured to detect cash register paper status information, and each printer control terminal is specifically configured to:

obtain the cash register paper status information detected by the photoelectric sensor, and further locally obtain and play the corresponding advertisement prompt message based on the advertisement information printed by the duplex printer when it is determined that the cash register paper is removed.

The cash register paper status information is status information that is obtained by performing an analysis based on a photoelectric signal detected by the photoelectric sensor and is used to determine whether the cash register paper is removed. The photoelectric sensor may be a reflective photoelectric sensor and is disposed in an area covered by printed cash register paper at the cash register paper printing outlet. Whether cash register paper covers the photoelectric sensor can be analyzed based on a detected reflected signal, so as to determine and obtain the status information about whether the cash register paper is removed.

The advertisement releasing terminal may be a specially configured computer, or only a mobile phone with corresponding permissions, or only an APP having an advertisement information releasing function. In the present disclosure, the advertisement releasing terminal mainly functions as an information releasing interface. When a user releases advertisement information, the information can be sent to the advertisement releasing terminal through various intelligent terminals, so that an operator of the advertisement releasing terminal edits the advertisement information and sends the advertisement information to the cloud advertisement server.

The system can send to-be-sent advertisement information in time to the duplex printer for printing, provided that the duplex printer is configured in each charging terminal in advance, such as a convenience store, a shop, or a supermarket, and wireless communication is established between the duplex printer and the cloud advertisement server. As such, various types of advertisement information can be printed with no need to consume a large quantity of manpower and material resources in advance for printing, and the advertisement information can be updated or released at any time. The system is high in timeliness, and can meet requirements for advertisement information pushing. Moreover, this method is more environmentally friendly and requires no additional material consumption. In addition, the system can also realize timely advertisement reminding, and the corresponding image/video/audio can be played based on the printed advertisement content, so that attention of consumers can be called to the advertisement information, and a better advertising effect can be realized.

Correspondingly, the advertising method based on this embodiment is as follows:

Referring to FIG. 2, an intelligent advertisement method based on a duplex printer includes the following steps.

S1: Obtaining historical printed data of a plurality of duplex printers within a period of time, perform data cleansing, and further performing clustering and grouping based on commodity information in the historical printed data to classify the plurality of duplex printers into a plurality of specified categories.

The specified categories refer to a plurality of categories obtained through division based on distribution areas, industry information, or printed commodity information of the duplex printers. Preferably, in this embodiment, the specified categories refer to a plurality of categories obtained by obtaining historical printed data of a plurality of duplex printers within a period of time, performing data cleansing, and further performing clustering and grouping based on commodity information in the historical printed data. Performing data cleansing includes performing abnormal data processing and deletion processing of small-probability data. The abnormal data processing refers to removal of data that apparently do not belong to commodity information. The deletion processing of small-probability data refers to deletion of commodity data with an occurrence quantity less than a preset proportion threshold in historical printed data, so that commodities that rarely appear can be removed during categorization performed based on the commodity information, thereby reducing generation of invalid categories. Performing clustering and grouping based on the commodity information in the historical printed data refers to grouping a plurality of duplex printers based on categories of commodity information printed by the duplex printers. For example, if commodity information in historical printed data of a certain duplex printer is mainly about stationery, the duplex printer is clustered into a group named "stationery". If commodity information in historical printed data of a certain duplex printer is mainly about clothing, the duplex printer can be clustered into a group named "clothing". By analogy, similar groups such as "catering" and "convenience store" can further be obtained. Finally, each group is used as a specified category.

S2: Obtaining, by the cloud advertisement server, through matching based on a specified category of each duplex printer, first N pieces of advertisement information with the highest printing frequency corresponding to the specified category, further obtaining advertisement prompt messages corresponding to the N pieces of advertisement information, and then sending the advertisement prompt messages to a printer control terminal corresponding to the duplex printer for storage; where N is a preset positive integer.

The first N pieces of advertisement information with the highest printing frequency corresponding to the specified category are obtained through the following steps of:

sending, through each duplex printer, real-time printed data in a period of time to the cloud advertisement server; and collecting, through the cloud advertisement server, cloud statistics on the real-time printed data of the duplex printer of each specified category, and extracting and obtaining first N pieces of advertisement information with the highest printing frequency corresponding to the specified category.

S3: Receiving, through an advertisement releasing terminal, advertisement content input by a user, generating advertisement information, and then sending the advertisement information to a cloud advertisement server.

S4: Receiving, through the cloud advertisement server, the advertisement information sent by the advertisement releasing terminal, and then pushing the advertisement information to each duplex printer.

S5: Receiving, through each duplex printer, the advertisement information and printing the advertisement information on the back of cash register paper while printing cash register information, specifically including sub-steps of S31 and S32:

S31: Receiving and parsing, by each duplex printer, the advertisement information, and generating a corresponding printing format based on dimensions of the cash register paper.

S32: Printing the advertisement information in the corresponding printing format on the back of the cash register paper in real time while printing the cash register information.

S6: Playing, by each printer control terminal, a corresponding advertisement prompt message based on the advertisement information printed by the duplex printer, specifically including: obtaining, through each printer control terminal, the cash register paper status information detected by the photoelectric sensor, and further locally obtaining and playing the corresponding advertisement prompt message based on the advertisement information printed by the duplex printer when it is determined that the cash register paper is removed.

S7: When each printer control terminal does not locally obtain the advertisement prompt message corresponding to the advertisement information, counting the advertisement information, and sending an advertisement prompt message request to the cloud advertisement server after a count value reaches a preset threshold. In this case, the cloud advertisement server can obtain the advertisement prompt message corresponding to the advertisement information through matching and then send the advertisement prompt message to the corresponding printer control terminal for storage.

In this embodiment, the method further includes the following steps of:

receiving, through the advertisement releasing terminal, advertisement prompt messages associated with different advertisement information input by a user, sending the advertisement prompt messages to the cloud advertisement server; and establishing, through the cloud advertisement server, an advertisement prompt message database and a corresponding mapping relationship database based on the received advertisement prompt messages and association relationships thereof;

the mapping relationship database is used for reflecting mapping relationships between different advertisement messages and corresponding advertisement prompt messages.

The cloud advertisement server matches the N pieces of advertisement information with the mapping relationship database, and then extracts corresponding advertisement prompt messages from the advertisement prompt message database based on obtained mapping relationships, so as to obtain the advertisement prompt messages corresponding to the N pieces of advertisement information.

Preferably, in this embodiment, the method further includes the following two steps of:

sending, through each duplex printer, printed commodity information to the cloud advertisement server in real time; and performing, through the cloud advertisement server, data cleansing periodically based on historical printed data of each duplex printer, further performing clustering and grouping based on commodity information in the historical printed data, and then updating the specified categories of the plurality of duplex printers.

Therefore, in the present disclosure, a cloud advertisement server, an advertisement releasing terminal, a plurality of duplex printers, and a plurality of printer control terminals are adopted, so that to-be-sent advertisement information can be sent in time over a communication network to the duplex printers for targeted printing. As such, various types of advertisement information can be printed with no need to consume a large quantity of manpower and material resources in advance for printing, and the advertisement information can be updated or released at any time. Moreover, timely advertisement reminding can be implemented when the advertisement information is printed, and corresponding images/videos/audios can be played based on the printed advertisement content. In this way, attention of consumers can be called to the advertisement information, thereby achieving better advertisement effects. This method is high in timeliness and has a good data pushing effect, and can meet requirements for advertisement information pushing.

The preferred embodiments of the present disclosure have been described in detail above, but the present disclosure is not limited to the embodiments. Various equivalent modifications or replacements can be made by those skilled in the art without departing from the concept of the present disclosure. These equivalent modifications or replacements fall within the scope of the claims of the present application.

What is claimed is:

1. An intelligent advertisement system based on a duplex printer, comprising a cloud advertisement server, at least one advertisement releasing terminal, and a plurality of duplex printers, wherein the cloud advertisement server is wirelessly connected to the advertisement releasing terminal and each of the plurality of duplex printers respectively, and each of the plurality of duplex printers is connected to a printer control terminal;

the advertisement releasing terminal is configured to receive advertisement content input by a user, generate advertisement information, and then send the advertisement information to the cloud advertisement server;

the cloud advertisement server is configured to receive the advertisement information sent by the advertisement releasing terminal, and then push the advertisement information to each of the plurality of duplex printers;

each of the plurality of duplex printers is configured to receive the advertisement information and print the advertisement information on a back of cash register paper while printing cash register information; and each printer control terminal is configured to play a corresponding advertisement prompt message based on the advertisement information printed by the duplex printer;

wherein, the printer control terminal is provided with an advertisement display screen, a voice playing module, and/or a short message sending module, and the advertisement prompt message comprises an advertisement prompt image or video to be played through the advertisement display screen, an advertisement prompt audio to be played through the voice playing module, and/or short message notification information to be sent through the short message sending module.

2. The intelligent advertisement system based on a duplex printer of claim 1, wherein the plurality of duplex printers are divided into a plurality of specified categories in advance, and the advertisement prompt message is obtained and stored in the printer control terminal by:

obtaining, by the cloud advertisement server, through matching based on a specified category of each of the plurality of duplex printers, first N pieces of advertisement information with the highest printing frequency corresponding to the specified category, further obtaining advertisement prompt messages corresponding to the N pieces of advertisement information, and then sending the advertisement prompt messages to a printer control terminal corresponding to each of the plurality of duplex printers for storage; wherein N is a preset positive integer.

3. The intelligent advertisement system based on a duplex printer of claim 2, wherein near a cash register paper printing outlet, the duplex printer is provided with a photoelectric sensor configured to detect cash register paper status information, and each printer control terminal is specifically configured to:

obtain the cash register paper status information detected by the photoelectric sensor, and further locally obtain and play the corresponding advertisement prompt message based on the advertisement information printed by the duplex printer when it is determined that the cash register paper is removed.

4. An intelligent advertisement method based on a duplex printer, comprising steps of:

receiving, through an advertisement releasing terminal, advertisement content input by a user, generating advertisement information, and then sending the advertisement information to a cloud advertisement server;

receiving, through the cloud advertisement server, the advertisement information sent by the advertisement releasing terminal, and then pushing the advertisement information to each of a plurality of duplex printers;

receiving, through each of the plurality of duplex printers, the advertisement information and printing the advertisement information on a back of cash register paper while printing cash register information; and playing, through each printer control terminal, a corresponding advertisement prompt message based on the advertisement information printed by the duplex printer;

wherein, the plurality of duplex printers are divided into a plurality of specified categories in advance, and the intelligent advertisement method further comprises the following steps of:

obtaining, by the cloud advertisement server through matching based on a specified category of each of the plurality of duplex printers, first N pieces of advertisement information with the highest printing frequency corresponding to the specified category, further obtaining advertisement prompt messages corresponding to the N pieces of advertisement information, and then sending the advertisement prompt messages to a printer control terminal corresponding to each of the plurality of the duplex printers for storage; wherein N is a preset positive integer.

5. The intelligent advertisement method based on a duplex printer of claim 4, wherein the step of playing, through each printer control terminal, a corresponding advertisement prompt message based on the advertisement information printed by the duplex printer is specifically:

obtaining, through each printer control terminal, cash register paper status information detected by a photoelectric sensor, and further locally obtaining and playing the corresponding advertisement prompt message based on the advertisement information printed by the duplex printer when it is determined that the cash register paper is removed.

6. The intelligent advertisement method based on a duplex printer of claim 5, further comprising the following steps of:

when each printer control terminal does not locally obtain the advertisement prompt message corresponding to the advertisement information, counting the advertisement information, and sending an advertisement prompt message request to the cloud advertisement server after a count value reaches a preset threshold.

7. The intelligent advertisement method based on a duplex printer of claim 4, wherein the first N pieces of advertisement information with the highest printing frequency corresponding to the specified category are obtained through the following steps of:

sending, through each of the plurality of duplex printers, real-time printed data in a period of time to the cloud advertisement server; and collecting, through the cloud advertisement server, cloud statistics on the real-time printed data of the duplex printer of each specified category, and extracting and obtaining first N pieces of advertisement information with the highest printing frequency corresponding to the specified category.

8. The intelligent advertisement method based on a duplex printer of claim 4, further comprising the following steps of:

receiving, through the advertisement releasing terminal, advertisement prompt messages associated with different advertisement information input by a user, sending the advertisement prompt messages to the cloud advertisement server; and establishing, through the cloud advertisement server, an advertisement prompt message database and a corresponding mapping relationship database based on the received advertisement prompt messages and association relationships thereof; wherein the mapping relationship database is used for reflecting mapping relationships between different advertisement messages and corresponding advertisement prompt messages.

* * * * *